(12) United States Patent
Sakamoto (10) Patent No.: US 11,898,929 B2
(45) Date of Patent: Feb. 13, 2024

(54) THERMAL MANAGEMENT SYSTEM FOR VEHICLE

(71) Applicants: TOYOTA JIDOSHA KABUSHIKI KAISHA, Toyota (JP); SUBARU CORPORATION, Tokyo (JP)

(72) Inventor: Hironobu Sakamoto, Okazaki (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 98 days.

(21) Appl. No.: 17/738,432

(22) Filed: May 6, 2022

(65) Prior Publication Data
US 2022/0390323 A1 Dec. 8, 2022

(30) Foreign Application Priority Data
Jun. 7, 2021 (JP) .................. 2021-095434

(51) Int. Cl.
*G01M 13/003* (2019.01)
*B60H 1/00* (2006.01)
(Continued)

(52) U.S. Cl.
CPC ...... *G01M 13/003* (2019.01); *B60H 1/00007* (2013.01); *B60H 1/32284* (2019.05); *B60K 11/02* (2013.01); *G05D 23/193* (2013.01); *B60H 1/00278* (2013.01); *B60H 1/00885* (2013.01); *B60H 2001/00307* (2013.01); *B60K 2001/005* (2013.01); *B60K 2001/008* (2013.01); *B60L 58/24* (2019.02); *B60Y 2400/302* (2013.01)

(58) Field of Classification Search
CPC ............ G01M 13/003; B60H 1/00007; B60H 1/32284; B60H 1/00278; B60H 1/00885; B60H 2001/00307; B60H 1/00485; B60H 1/00392; B60H 1/00642; B60K 11/02; B60K 2001/005; B60K 2001/008; G05D 23/193; B60L 58/24; B60Y 2400/302
See application file for complete search history.

(56) References Cited

U.S. PATENT DOCUMENTS 9,809,081 B2 * 11/2017 Suzuki .................... F25B 40/00
10,900,697 B2 * 1/2021 Huenemoerder ..... F25B 25/005
(Continued)

FOREIGN PATENT DOCUMENTS

JP 2015-030289 A 2/2015

*Primary Examiner* — Ljiljana V. Ciric
(74) *Attorney, Agent, or Firm* — Sughrue Mion, PLLC (57) ABSTRACT

A thermal management system includes a switching valve that switches between a first mode in which first and second flow paths are separated and a second mode in which parts of the first and second flow paths are connected. In the first mode, a control unit acquires measured values of first and second temperatures in the first and second flow paths and estimated values of the first and second temperatures when the switching valve is not in a slightly open state. The switching valve is in the slightly open state when the measured value of the first temperature is higher than the estimated value of the first temperature by a value greater than a first predetermined threshold and the measured value of the second temperature is lower than the estimated value of the second temperature by a value greater than a second predetermined threshold.

8 Claims, 7 Drawing Sheets

(51) Int. Cl.
    *G05D 23/19*      (2006.01)
    *B60H 1/32*      (2006.01)
    *B60K 11/02*      (2006.01)
    *B60L 58/24*      (2019.01)
    *B60K 1/00*      (2006.01)

(56) References Cited

U.S. PATENT DOCUMENTS

| | | | |
|---|---|---|---|
| 11,407,281 B2 * | 8/2022 | Kinoshita | B60H 1/00278 |
| 2014/0096550 A1 * | 4/2014 | Gao | B60L 3/0046 |
| | | | 62/126 |
| 2015/0217623 A1 * | 8/2015 | Hatakeyama | B60L 1/02 |
| | | | 429/62 |
| 2016/0159204 A1 * | 6/2016 | Katoh | F25B 49/022 |
| | | | 62/185 |
| 2016/0167481 A1 | 6/2016 | Makihara et al. | |
| 2017/0008407 A1 * | 1/2017 | Porras | B60H 1/00921 |
| 2017/0151857 A1 * | 6/2017 | Suzuki | F25B 6/04 |
| 2018/0201096 A1 * | 7/2018 | Tsubouchi | F25B 17/08 |
| 2019/0078497 A1 * | 3/2019 | Enomoto | B60K 11/04 |
| 2019/0275858 A1 * | 9/2019 | Seki | B60H 1/00907 |
| 2021/0291625 A1 * | 9/2021 | Kinoshita | B60K 1/00 |
| 2022/0302519 A1 * | 9/2022 | Tsuruta | H01M 10/635 |
| 2022/0371402 A1 * | 11/2022 | Hasegawa | H01M 10/60 |
| 2022/0390323 A1 * | 12/2022 | Sakamoto | B60K 11/02 |
| 2023/0008243 A1 * | 1/2023 | Asanuma | H01M 8/04358 |
| 2023/0294481 A1 * | 9/2023 | Rebinger | F25B 6/02 |
| | | | 62/239 |

\* cited by examiner

THERMAL MANAGEMENT SYSTEM FOR VEHICLE

CROSS-REFERENCE TO RELATED APPLICATION

This application claims priority to Japanese Patent Application No. 2021-095434 filed on Jun. 7, 2021, incorporated herein by reference in its entirety.

BACKGROUND

1. Technical Field

The technique disclosed herein relates to thermal management systems for vehicles.

2. Description of Related Art

Japanese Unexamined Patent Application Publication No. 2015-30289 (JP 2015-30289 A) discloses a thermal management system for a vehicle capable of switching connections among a plurality of flow paths. In order to switch the flow paths, the thermal management system includes switching valves for controlling the flow in the flow paths.

SUMMARY

When controlling the flow in the flow paths, it is important to detect an abnormality in the switching valves. It is easy to detect a failure of the switching valve because the temperature behavior of a heating medium becomes obviously abnormal when the switching valve stops operating due to the failure. However, there are cases where the switching valve is in a slightly open state, which is a state that a valve element fails to close completely and the heating medium leaks from the gap. It is more difficult to detect the slightly open state than the failure. The present specification provides a technique capable of solving such a problem.

A thermal management system disclosed in the present specification is used for a vehicle. A thermal management system according to one aspect of the present disclosure includes: a first flow path through which a heating medium flows; a first pump that is located on the first flow path and that circulates the heating medium in the first flow path; and a first temperature sensor that is located on the first flow path and that is configured to measure a first temperature of the heating medium. The thermal management system further includes: a second flow path through which the heating medium flows; a second pump that is located on the second flow path and that circulates the heating medium in the second flow path; and a second temperature sensor that is located on the second flow path and that is configured to measure a second temperature of the heating medium. The thermal management system further includes a switching valve configured to switch between a first mode in which the first flow path and the second flow path are separated and a second mode in which a part of the first flow path and a part of the second flow path are connected to constitute a third flow path. The thermal management system further includes a control unit that determines whether the switching valve is in a slightly open state. A temperature of the heating medium in the second flow path is higher than a temperature of the heating medium in the first flow path. In the first mode, the control unit acquires a measured value of the first temperature from the first temperature sensor and a measured value of the second temperature from the second temperature sensor at first predetermined time that is when a predetermined amount of time has passed since at least one of the first temperature and the second temperature started to rise. The control unit acquires an estimated value of the first temperature and an estimated value of the second temperature at the first predetermined time that are estimated values when the switching valve is not in the slightly open state. The control unit determines that the switching valve is in the slightly open state when the measured value of the first temperature is higher than the estimated value of the first temperature by a value greater than a first predetermined threshold and the measured value of the second temperature is lower than the estimated value of the second temperature by a value greater than a second predetermined threshold.

When the switching valve is in the slightly open state in the first mode, the heating medium in the first flow path and the heating medium in the second flow path are slightly mixed together. Therefore, heat is transferred from the high temperature heating medium in the second flow path to the low temperature heating medium in the first flow path. Due to this heat transfer, the temperature of the heating medium in the first flow path becomes higher than the estimated temperature when the switching valve is not in the slightly open state. Moreover, the temperature of the heating medium in the second flow path becomes lower than the estimated temperature when the switching valve is not in the slightly open state. Therefore, the switching valve can be detected to be in the slightly open state by detecting that the measured value of the first temperature is higher than the estimated value of the first temperature by a value greater than the first predetermined threshold and that the measured value of the second temperature is lower than the estimated value of the second temperature by a value greater than the second predetermined threshold.

The thermal management system according to the above aspect may further include a third temperature sensor that is located on the third flow path and that is configured to measure a third temperature of the heating medium. The first temperature sensor may be located on the first flow path at a part that does not constitute the third flow path. The second temperature sensor may be located on the second flow path at a part that does not constitute the third flow path. A temperature of the heating medium in the third flow path may be higher than the temperature of the heating medium in the first flow path and the temperature of the heating medium in the second flow path. In the second mode, the control unit may acquire the measured value of the first temperature from the first temperature sensor, the measured value of the second temperature from the second temperature sensor, and a measured value of the third temperature from the third temperature sensor at second predetermined time that is when a predetermined amount of time has passed since the third temperature started to rise. The control unit may acquire the estimated value of the first temperature, the estimated value of the second temperature, and an estimated value of the third temperature at the second predetermined time that are estimated values when the switching valve is not in the slightly open state. The control unit may determine that the switching valve is in the slightly open state when the measured value of the first temperature is higher than the estimated value of the first temperature by a value greater than the first predetermined threshold, the measured value of the second temperature is higher than the estimated value of the second temperature by a value greater than the second predetermined threshold, and the measured value of the third temperature is lower than the estimated value of the third temperature by a value greater than a third predetermined threshold.

The thermal management system according to the above aspect may include a heat generation map showing amounts of heat to be generated by heat generation sources in the first to third flow paths in various operating states. The estimated value of the first temperature, the estimated value of the second temperature, and the estimated value of the third temperature may be obtained based on the heat generation map.

In the thermal management system according to the above aspect, when the control unit determines that the switching valve is in the slightly open state in the first mode, the control unit may perform a flow rate regulating process of regulating a flow rate of at least one of the first pump and the second pump so as to reduce a pressure difference between a first pressure and a second pressure, the first pressure being a pressure on a side of the switching valve at the first flow path, and the second pressure being a pressure on a side of the switching valve at the second flow path. While performing the flow rate regulating process, the control unit may perform a process of changing the switching valve to a state corresponding to a mode other than the first mode and then returning the switching valve to a state corresponding to the first mode. The control unit may perform a process of ending the flow rate regulating process.

In the thermal management system according to the above aspect, in the flow rate regulating process, at least one of a process of reducing the flow rate of the first pump and a process of increasing the flow rate of the second pump may be performed when the first pressure is higher than the second pressure. At least one of a process of reducing the flow rate of the second pump and a process of increasing the flow rate of the first pump may be performed when the second pressure is higher than the first pressure.

In the thermal management system according to the above aspect, in the flow rate regulating process, the first pump and the second pump may be stopped so as to substantially balance the first pressure and the second pressure.

In the thermal management system according to the above aspect, the switching valve may include a valve element that contacts a valve seat in the first mode. The first pressure may be applied to one side of the valve element, and the second pressure may be applied to another side of the valve element. In the flow rate regulating process, the flow rate of at least one of the first pump and the second pump may be regulated so as to cause a pressure difference in a direction that the valve element moves toward the valve seat.

In the thermal management system according to the above aspect, in the first mode, the control unit may acquire the measured value of the first temperature from the first temperature sensor and the measured value of the second temperature from the second temperature sensor at third predetermined time that is when a predetermined amount of time has passed since at least one of the first temperature and the second temperature started to rise. When the first temperature and the second temperature are equal to each other, the control unit may determine that the switching valve is broken.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the technology, the thermal management system may further include the third temperature sensor that is located on the third flow path and is configured to measure the third temperature of the heating medium. The first temperature sensor may be located on the first flow path at a part that does not constitute the third flow path. The second temperature sensor may be located on the second flow path at a part that does not constitute the third flow path. The temperature of the heating medium in the third flow path may be higher than the temperature of the heating medium in the first flow path and the temperature of the heating medium in the second flow path. In the second mode, the control unit may acquire the measured value of the first temperature from the first temperature sensor, the measured value of the second temperature from the second temperature sensor, and the measured value of the third temperature from the third temperature sensor at the second predetermined time that is when the predetermined amount of time has passed since the third temperature started to rise. The control unit may acquire the estimated value of the first temperature, the estimated value of the second temperature, and the estimated value of the third temperature at the second predetermined time that are estimated values when the switching valve is not in the slightly open state. The control unit may determine that the switching valve is in the slightly open state when the measured value of the first temperature is higher than the estimated value of the first temperature by a value greater than a first predetermined threshold, the measured value of the second temperature is higher than the estimated value of the second temperature by a value greater than a second predetermined threshold, and the measured value of the third temperature is lower than the estimated value of the third temperature by a value greater than a third predetermined threshold.

When the switching valve is in the slightly open state in the second mode, the heating medium in the first and second flow paths at the parts that do not form the third flow path and the heating medium in the third flow path are slightly mixed together. Therefore, heat is transferred from the high temperature heating medium in the third flow path to the low temperature heating medium in the first and second flow paths. Due to this heat transfer, the temperature of the heating medium in the third flow path becomes lower than the estimated temperature when the switching valve is not in the slightly open state. Moreover, the temperature of the heating medium in the first flow path and the temperature of the heating medium in the second flow path become higher than the estimated temperature when the switching valve is not in the slightly open state. Therefore, the switching valve can be detected to be in the slightly open state by detecting that the measured value of the third temperature is lower than the estimated value of the third temperature by a value greater than the third predetermined threshold and that the measured values of the first and second temperatures are higher than the estimated values of the first and second temperatures by values greater than the respective predetermined thresholds.

In one embodiment of the technology, the thermal management system may include the heat generation map showing the amounts of heat to be generated by the heat generation sources in the first to third flow paths in various operating states. The estimated value of the first temperature, the estimated value of the second temperature, and the estimated value of the third temperature may be obtained based on the heat generation map. According to such a configuration, the rates of increase in first to third temperatures after the start of the first mode or the second mode can be accurately estimated.

In one embodiment of the technology, when it is determined that the switching valve is in the slightly open state in the first mode, the control unit may perform the flow rate regulating process of regulating the flow rate of at least one of the first pump and the second pump so as to reduce the pressure difference between the first pressure and the second pressure, the first pressure being a pressure on a side of the switching valve at the first flow path, and the second pressure being a pressure on a side of the switching valve at the second flow path. While performing the flow rate regulating process, the control unit may perform the process of changing the switching valve to the state corresponding to a mode other than the first mode and then returning the switching valve to the state corresponding to the first mode. The control unit may perform the process of ending the flow rate regulating process. A switching valve typically has a mechanism for closing a valve element by a pressing force of a spring etc. The valve element is subjected to the pressure difference between the first pressure and the second pressure when the valve element is closed (i.e., when the valve element is in a closed position). This pressure difference varies depending on the operating conditions of the first flow path and the second flow path. For example, depending on the condition of the fluctuation in pressure, the valve element may be closed in a tilted state. That is, the valve element may be in the slightly open state rather than being completely closed. In this technology, the valve element can be reclosed in a state that the pressure difference between the first and second pressures is reduced. Since the valve element can be closed with less influence from the pressure difference, the switching valve can be restored from the slightly open state.

In one embodiment of the present technology, in the flow rate regulating process, at least one of the process of reducing the flow rate of the first pump and the process of increasing the flow rate of the second pump may be performed when the first pressure is higher than the second pressure. In the flow rate regulating process, at least one of the process of reducing the flow rate of the second pump and the process of increasing the flow rate of the first pump may be performed when the second pressure is higher than the first pressure. With such a configuration, the pressure difference between the first pressure and the second pressure can be reduced.

In one embodiment of the technology, in the flow rate regulating process, the first pump and the second pump may be stopped so as to substantially balance the first pressure and the second pressure. According to such a configuration, the valve element can be reclosed in a state that there is no pressure difference between the first pressure and the second pressure. The switching valve can thus be reliably restored from the slightly open state.

In one embodiment of the technology, the switching valve may include the valve element that contacts the valve seat in the first mode. The first pressure may be applied to one side of the valve element, and the second pressure may be applied to the other side of the valve element. In the flow rate regulating process, the flow rate of at least one of the first pump and the second pump may be regulated so as to cause a pressure difference in a direction that the valve element moves toward the valve seat. According to such a configuration, the pressure difference between the first and second pressures can assist in the operation of pressing the valve element against the valve seat. The switching valve can thus be reliably restored from the slightly open state.

First Embodiment

Structure of Thermal Management System 100

Figure 1:
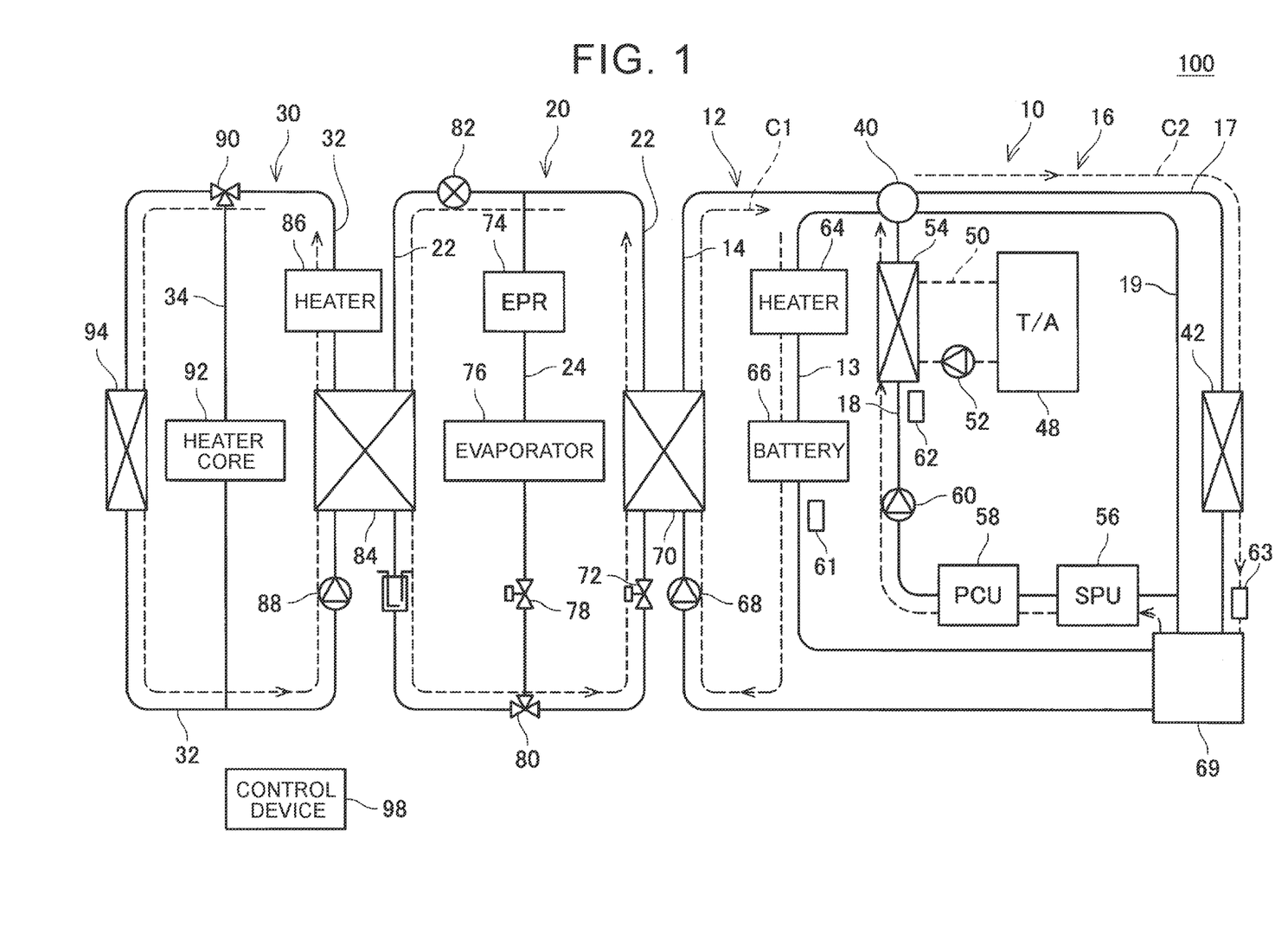
FIG. 1 shows a thermal management system 100.

A thermal management system 100 of an embodiment will be described with reference to the drawings. The thermal management system 100 of the present embodiment is mounted on an electrified vehicle, and for example, heats and cools components in the electrified vehicle and air conditions the electrified vehicle by circulating a heating medium such as antifreeze or cooling medium. As shown in FIG. 1, the thermal management system 100 includes: a low temperature radiator circuit 10 including a low temperature radiator 42; a high temperature radiator circuit 30 including a high temperature radiator 94; a heat pump circuit 20 thermally interposed between the two radiator circuits 10, 30; and a control device 98. These circuits 10, 20, and 30 are thermally connected, but their paths through which the heating medium flows are independent of each other. Although the heating medium is not particularly limited, antifreeze such as long life coolant is used as the heating medium in the two radiator circuits 10, 30. A cooling medium (heating medium for a refrigeration cycle) such as hydrofluorocarbon is used as the heating medium in the heat pump circuit 20.

The low temperature radiator circuit 10 and the heat pump circuit 20 are thermally connected via a chiller 70. The heat pump circuit 20 and the high temperature radiator circuit 30 are thermally connected via a condenser 84. The chiller 70 functions as an evaporator in the low temperature radiator circuit 10 and can transfer heat from the heating medium in the low temperature radiator circuit 10 to the heating medium in the heat pump circuit 20. The condenser 84 functions as an evaporator in the heat pump circuit 20 and can transfer heat from the heating medium in the heat pump circuit 20 to the heating medium in the high temperature radiator circuit 30.

Structure of Low Temperature Radiator Circuit 10

The low temperature radiator circuit 10 includes a first circuit 12 that cools a secondary battery for a vehicle (hereinafter simply referred to as the "battery") 66, and a second circuit 16 that cools heat-related devices.

The first circuit 12 is a circulation path that circulates the heating medium between the chiller 70 and the battery 66. The first circuit 12 mainly includes a battery path 13 and a chiller path 14. The battery path 13 includes a heater 64, the battery 66, and a first temperature sensor 61 in this order from the upstream side. The first temperature sensor 61 is a sensor for detecting the heating medium temperature on the outlet side of the battery 66. The battery 66 supplies electric power to a built-in motor of a transaxle 48 via a smart power unit (SPU) 56 and a power control unit (PCU) 58 that will be described later. The battery 66 is cooled by heat exchange with the heating medium flowing through the battery path 13. The heater 64 is an electric heater. The heater 64 can heat the battery 66 by heating the heating medium in the battery path 13 as needed.

The chiller path 14 includes a first pump 68 that circulates the heating medium and the chiller 70 in this order from the upstream side. The upstream end of the battery path 13 and the downstream end of the chiller path 14 are connected via a switching valve 40. The downstream end of the battery path 13 and the upstream end of the chiller path 14 are connected via a reservoir tank 69. The reservoir tank 69 includes a heating medium storage unit for removing air bubbles from the heating medium.

The second circuit 16 mainly includes a low temperature radiator path 17 and a heat-related device path 18. The upstream end of the low temperature radiator path 17 and the downstream end of the heat-related device path 18 are connected via the switching valve 40. The downstream end of the low temperature radiator path 17 and the upstream end of the heat-related device path 18 are connected via the reservoir tank 69. The low temperature radiator 42 is shared between the first circuit 12 and the second circuit 16. The low temperature radiator circuit 10 can thus be efficiently configured.

The low temperature radiator path 17 includes the low temperature radiator 42 and a third temperature sensor 63 for detecting the heating medium temperature in this order from the upstream side. The heat-related device path 18 includes the following components in the following order from the upstream side: the SPU 56 including a direct current to direct current (DC-to-DC) converter; the PCU 58 including an inverter; a second pump 60 for circulating the heating medium; a second temperature sensor 62 for detecting the heating medium temperature; and an oil cooler 54. The oil cooler 54 is a kind of heat exchanger and is thermally connected to the transaxle 48 via an oil circulation path 50. The transaxle 48 includes a traction motor that drives a wheel, a speed reducer interposed between the traction motor and the wheel, etc. The oil circulation path 50 includes an oil pump 52 and circulates oil, namely the heating medium, between the oil cooler 54 and the transaxle 48. The heat of the transaxle 48 is thus transferred to the oil cooler 54 and is further transferred from the oil cooler 54 to the heating medium in the second circuit 16.

The second circuit 16 further includes a bypass path 19. The bypass path 19 bypasses the low temperature radiator 42. The bypass path 19 branches at the switching valve 40 located at the connection between the low temperature radiator path 17 and the heat-related device path 18, bypasses the low temperature radiator 42, and connects to the reservoir tank 69 located at the downstream end of the low temperature radiator path 17.

The control device 98 is configured as a so-called computer including at least one processor and a memory. A slightly open state determination program and a heat generation map are stored in the memory. The slightly open state determination program is a program for determining whether the switching valve 40 is in a slightly open state. The processor performs a series of processes of determining whether the switching valve 40 is in the slightly open state by executing the slightly open state determination program. The heat generation map is a map showing the amounts of heat to be generated by heat generation sources in a first flow path C1, a second flow path C2, and a third flow path C3 in various operating states. The control device 98 acquires first to third temperature measured values T1$m$ to T3$m$ from first to third temperature sensors 61 to 63, respectively.

Function of Switching Valve 40

The switching valve 40 is a five-way flow control valve, and connects the three paths 17, 18, and 19 of the second circuit 16 in addition to the two paths 13, 14 of the first circuit 12. The switching valve 40 is connected to the control device 98, and the control device 98 controls the operation of the switching valve 40. The structure of the switching valve 40 is not particularly limited, and the switching valve 40 may have various structures.

The switching valve 40 can switch the flow paths between a first mode and a second mode. FIG. 1 shows the first mode. The first mode is a mode in which the first flow path C1 and the second flow path C2 are separated. The first flow path C1 and the second flow path C2 can operate independently of each other. The first flow path C1 is a flow path that circulates the heating medium between the chiller 70 and the battery 66 by using the first pump 68. The battery 66 can be cooled by the first flow path C1. The second flow path C2 is a flow path that circulates the heating medium between the low temperature radiator 42 and some heat-related devices (oil cooler 54, SPU 56, and PCU 58) by using the second pump 60. The heat-related devices can be cooled by the second flow path C2. The heat-related devices generate more heat than the battery 66. Therefore, the temperature of the heating medium in the second flow path C2 is higher than the temperature of the heating medium in the first flow path C1.

Figure 2:
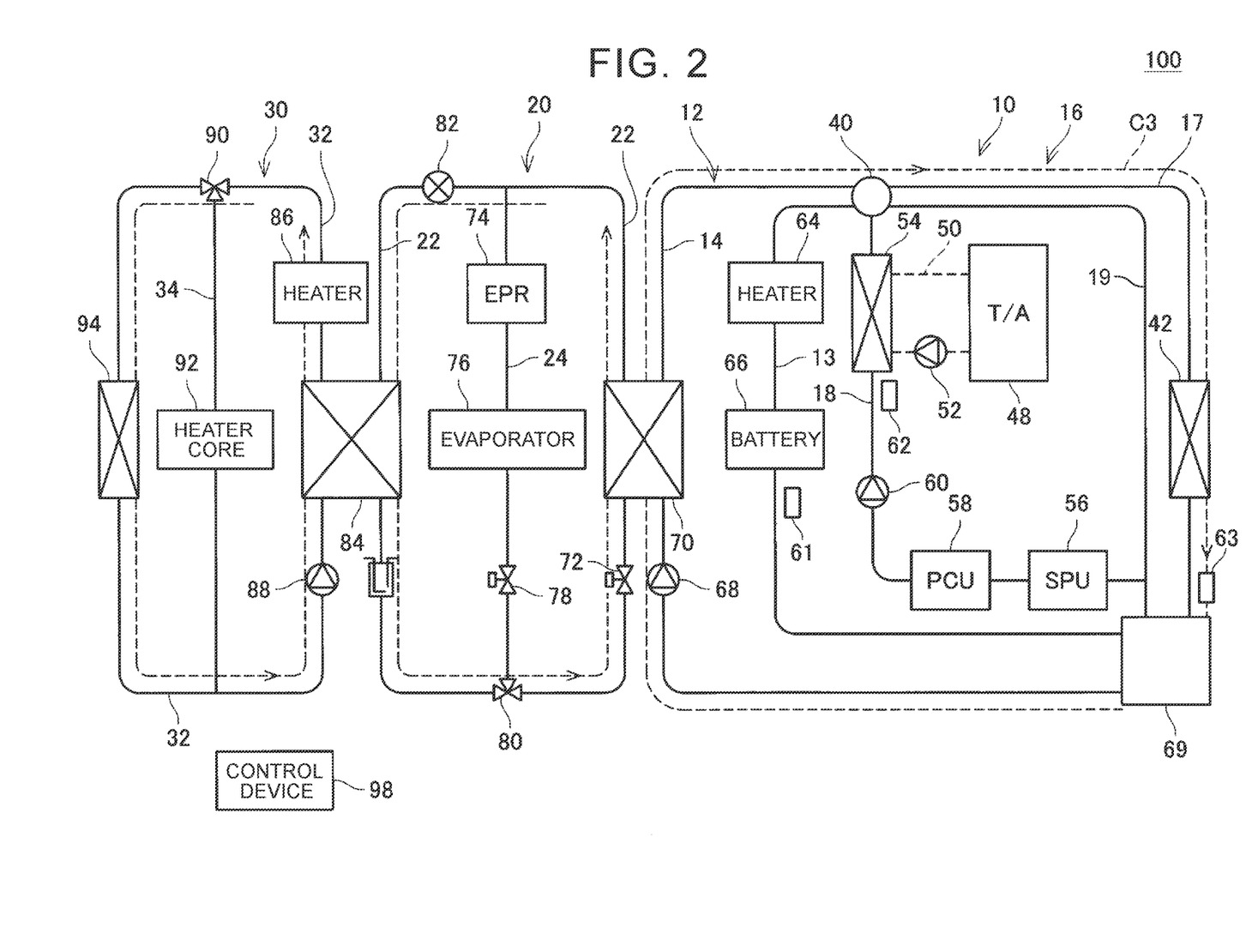
FIG. 2 shows the thermal management system 100.

FIG. 2 shows the second mode. The second mode is a mode in which a part of the first flow path C1 and a part of the second flow path C2 are connected to constitute the third flow path C3. The third flow path C3 is a flow path that circulates the heating medium between the low temperature radiator 42 and the chiller 70 by using the first pump 68. The third flow path C3 can supply the heat absorbed from the outside air by the low temperature radiator 42 to the chiller 70.

As shown in FIG. 1, the first pump 68 is located on the first flow path C1, and the second pump 60 is located on the second flow path C2. As shown in FIG. 2, the first temperature sensor 61 is located on the first flow path C1 at a part that does not constitute the third flow path C3. The second temperature sensor 62 is located on the second flow path C2 at a part that does not constitute the third flow path C3. The third temperature sensor 63 is located on the third flow path C3.

Structure of Heat Pump Circuit 20

The heat pump circuit 20 mainly includes a main circuit 22 and a cooling path 24. The main circuit 22 is a circulation path that circulates the heating medium (cooling medium) between the chiller 70 and the condenser 84. The main circuit 22 further includes an expansion valve 72 and a compressor 82 and forms a so-called refrigeration cycle. The heating medium circulates counterclockwise in FIG. 1 in the main circuit 22. The main circuit 22 transfers heat from the low temperature radiator circuit 10 connected to the chiller 70 to the high temperature radiator circuit 30 connected to the condenser 84.

The cooling path 24 is in parallel with the chiller 70 and bypasses the chiller 70. An expansion valve 78, a cooling evaporator 76, and an evaporator pressure regulator (EPR) 74 are located in the cooling path 24. A switching valve 80 is located at the upstream end of the cooling path 24. The cooling evaporator 76 absorbs heat from air inside the vehicle (including air introduced from the outside into the vehicle) and transfers the heat to the heating medium in the heat pump circuit 20. The inside of the vehicle is thus cooled. The heat absorbed by the cooling evaporator 76 is transferred from the condenser 84 to the high temperature radiator circuit 30.

Structure of High Temperature Radiator Circuit 30

The high temperature radiator circuit 30 mainly includes a main circuit 32 and a heating path 34. The main circuit 32 of the high temperature radiator circuit 30 is a circulation path that circulates the heating medium between the condenser 84 and the high temperature radiator 94. A third pump 88 for circulating the heating medium is provided at the main circuit 32. The main circuit 32 dissipates the heat transferred from the heat pump circuit 20 from the high temperature radiator 94 to the outside air by circulating the heating medium. A heater 86 is also located in the main circuit 32.

The heating path 34 is in parallel with the high temperature radiator 94 and bypasses the high temperature radiator 94. A heater core 92 is located in the heating path 34. A switching valve 90 is located at the upstream end of the heating path 34. The heater core 92 dissipates heat from the heating medium flowing through the heating path 34 to air inside the vehicle. The inside of the vehicle is thus heated.

Slightly Open State Determination Process in First Mode (First Example)

Figure 3:
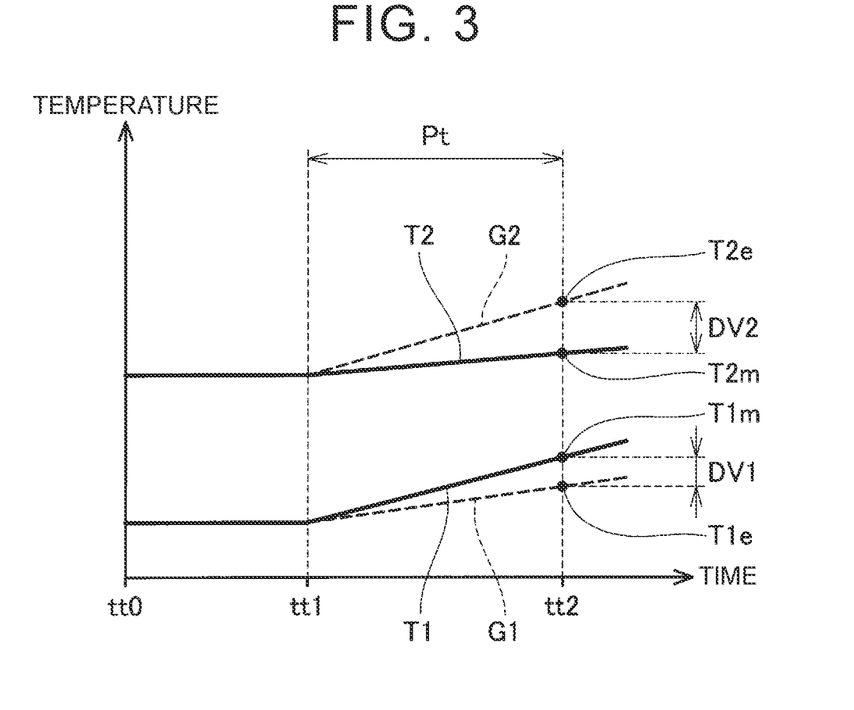
FIG. 3 is a temperature graph of a heating medium in a first mode.

Processing of the slightly open state determination program for determining whether the switching valve 40 is in the slightly open state in the first mode will be described. A first example in which the heating medium circulates in both the first flow path C1 and the second flow path C2 will be described with reference to FIG. 3. In FIG. 3, the abscissa represents time, and the ordinate represents the temperature of the heating medium. A first temperature T1 is a measured value of the first temperature sensor 61. A second temperature T2 is a measured value of the second temperature sensor 62.

At time tt0, the switching valve 40 is switched to separate the first flow path C1 and the second flow path C2 (see FIG. 1). At time tt1, the first pump 68 and the second pump 60 start to operate, so that the first temperature T1 and the second temperature T2 start to rise.

At time tt2, namely when a predetermined amount of time Pt has passed since time tt1, the first temperature measured value T1$m$ is acquired from the first temperature sensor 61, and the second temperature measured value T2$m$ is acquired from the second temperature sensor 62. The predetermined amount of time Pt is any amount of time that can be determined in advance.

A first temperature estimated value T1$e$ and a second temperature estimated value T2$e$ are also acquired. The first temperature estimated value T1$e$ is an estimated value of the first temperature T1 at time tt2 when the switching valve 40 is not in the slightly open state. The second temperature estimated value T2$e$ is an estimated value of the second temperature T2 at time tt2 when the switching valve 40 is not in the slightly open state. The first temperature estimated value T1$e$ and the second temperature estimated value T2$e$ can be obtained based on the heat generation map and whether the first pump 68 and the second pump 60 are in operation. The first temperature estimated value T1$e$ and the second temperature estimated value T2$e$ may be obtained by various methods. In the present embodiment, estimated graphs G1, G2 are obtained as shown by dashed lines in FIG. 3. The estimated graphs G1, G2 are graphs with an ascending slope that represent estimated values of the first temperature T1 and the second temperature T2 when the switching valve 40 is not in the slightly open state, respectively. The first temperature estimated value T1$e$ and the second temperature estimated value T2$e$ at time tt2 are obtained based on the estimated graphs G1, G2 respectively.

Thereafter, it is determined whether the first temperature measured value T1$m$ is higher than the first temperature estimated value T1$e$ by a value greater than a first predetermined threshold TH1. Specifically, it is determined whether the first temperature measured value T1$m$ is higher than the first temperature estimated value T1$e$ and whether a differential value DV1 between the first temperature measured value T1$m$ and the first temperature estimated value T1$e$ is greater than the first predetermined threshold TH1. It is also determined whether the second temperature measured value T2$m$ is lower than the second temperature estimated value T2$e$ by a value greater than a second predetermined threshold TH2. Specifically, it is determined whether the second temperature measured value T2$m$ is lower than the second temperature estimated value T2$e$ and whether a differential value DV2 between the second temperature measured value T2$m$ and the second temperature estimated value T2$e$ is greater than the second predetermined threshold TH2. When the first temperature measured value T1$m$ is higher than the first temperature estimated value T1$e$ by a value greater than the first predetermined threshold TH1 and the second temperature measured value T2$m$ is lower than the second temperature estimated value T2$e$ by a value greater than the second predetermined threshold TH2, it can be determined that the switching valve 40 is in the slightly open state.

The principle on how it is determined that the switching valve 40 is in the slightly open state will be described. When the switching valve 40 is in the slightly open state, the heating medium in the first flow path C1 and the heating medium in the second flow path C2 are slightly mixed together. Therefore, heat is transferred from the high temperature heating medium in the second flow path C2 to the low temperature heating medium in the first flow path C1. Due to this heat transfer, the measured ascending slope of the heating medium temperature in the second flow path C2 (slope of the second temperature T2) becomes gentler than the estimated ascending slope when the switching valve 40 is normal (slope of the estimated graph G2). On the other hand, the measured ascending slope of the heating medium temperature in the first flow path C1 (slope of the first temperature T1) becomes steeper than the estimated ascending slope when the switching valve 40 is normal (slope of the estimated graph G1).

That is, the heat transfer from the second flow path C2 to the first flow path C1 can be detected by detecting the following combination of changes in slopes: the rate of increase in second temperature T2 becomes lower than that when the switching valve 40 is normal, and the rate of increase in first temperature T1 becomes higher than that when the switching valve 40 is normal. Transfer of a non-negligible amount of heat can be detected by detecting that the decrease in rate of increase in second temperature T2 is greater than a predetermined value calculated from the second predetermined threshold TH2 and that the increase in rate of increase in first temperature T1 is greater than a predetermined value calculated from the first predetermined threshold TH1. As a result, it can be determined that the switching valve 40 is in the slightly open state.

The predetermined thresholds TH1, TH2 can be determined in advance based on the heat capacities of the first and second flow paths C1, C2, etc. For example, an allowable amount of heat, namely the maximum amount of heat allowed to transfer from the second flow path C2 to the first flow path C1 during the predetermined amount of time Pt, is obtained. Then, the amount by which the temperature of the heating medium in the first flow path C1 increases when the allowable amount of heat is applied to the first flow path C1 is obtained from the heat capacity of the first flow path C1, and the amount by which the temperature of the heating medium in the second flow path C2 decreases when the allowable amount of heat is taken away from the second flow path C2 is obtained from the heat capacity of the second flow path C2. The first predetermined threshold TH1 may be the obtained amount of increase in temperature of the heating medium in the first flow path C1, and the second predetermined threshold TH2 may be the obtained amount of decrease in temperature of the heating medium in the second flow path C2.

Figure 4:
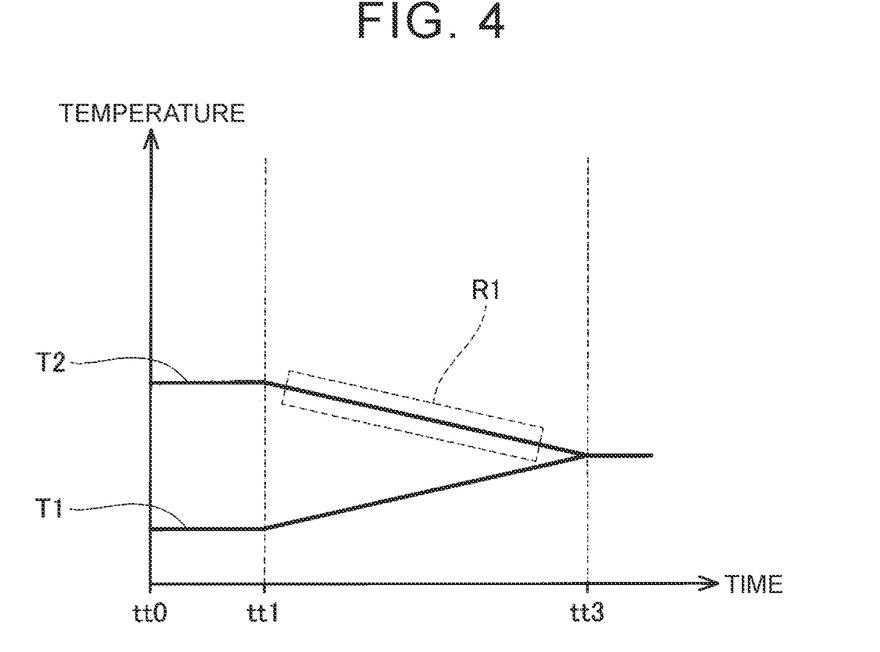
FIG. 4 shows an example of a temperature graph in case of a failure.

When the first flow path C1 and the second flow path C2 communicate with each other due to a failure of the switching valve 40, such a failure of the switching valve 40 can be easily distinguished from the slightly open state. FIG. 4 shows an example of a temperature graph in case of a failure. When the first pump 68 and the second pump 60 start to operate at time tt1, the high temperature heating medium of the second flow path C2 and the low temperature heating medium of the first flow path C1 are mixed together, so that the second temperature T2 instantaneously drops (see region R1). At time tt3, the first temperature T1 and the second temperature T2 become equal to each other and saturated. By detecting such characteristic temperature changes, it can be determined that the switching valve 40 is broken.

Slightly Open State Determination Process in First Mode (Second Example)

Processing of the slightly open state determination program in a second example in the first mode will be described. In the second example, the first flow path C1 is stopped, and the heating medium circulates only in the second flow path C2.

Figure 5:
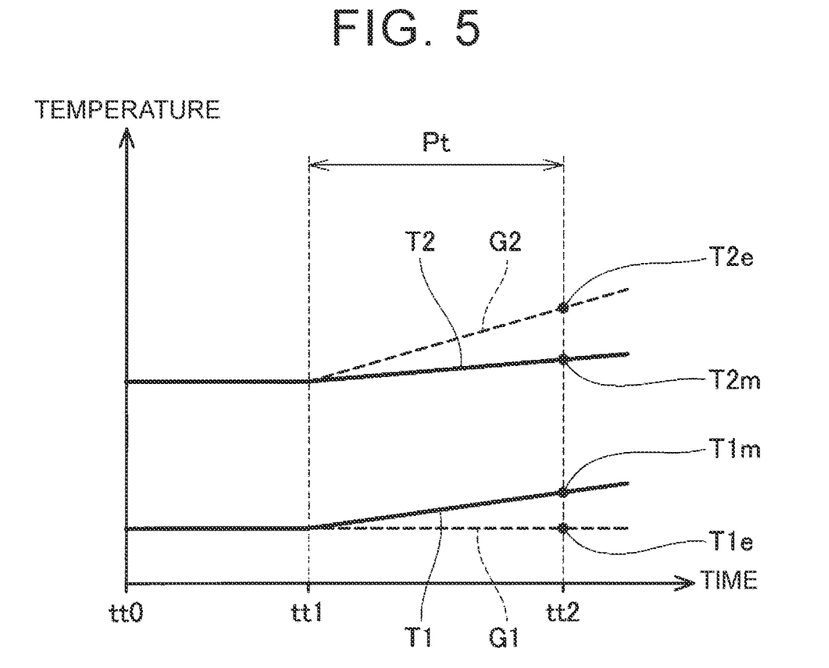
FIG. 5 is a temperature graph of the heating medium in the first mode.

The second pump 60 starts to operate at time tt1 in FIG. 5. Estimated graphs G1, G2 are obtained at time tt2 as shown by dashed lines. Since the second pump 60 is in operation, the estimated graph G2 ascends due to heat recovery. On the other hand, since the first pump 68 is stopped, the estimated graph G1 remains constant at its initial temperature. However, since the switching valve 40 is in the slightly open state, the measured ascending slope of the heating medium temperature in the second flow path C2 (slope of the second temperature T2) becomes gentler than the estimated ascending slope when the switching valve 40 is normal (slope of the estimated graph G2). On the other hand, the measured ascending slope of the heating medium temperature in the first flow path C1 (slope of the first temperature T1) becomes steeper than the estimated slope when the switching valve 40 is normal (slope of the estimated graph G1). It is then determined that the first temperature measured value T1$m$ is higher than the first temperature estimated value T1$e$ by a value greater than the first predetermined threshold TH1 and that the second temperature measured value T2$m$ is lower than the second temperature estimated value T2$e$ by a value greater than the second predetermined threshold TH2.

As described above, even when either the first flow path C1 or the second flow path C2 is stopped, the following combination of changes in slopes can be detected when the switching valve 40 is in the slightly open state: the rate of increase in second temperature T2 becomes lower than that when the switching valve 40 is normal, and the rate of increase in first temperature T1 becomes higher than that when the switching valve 40 is normal. It can thus be determined that the switching valve 40 is in the slightly open state.

Slightly Open State Determination Process in Second Mode

Figure 6:
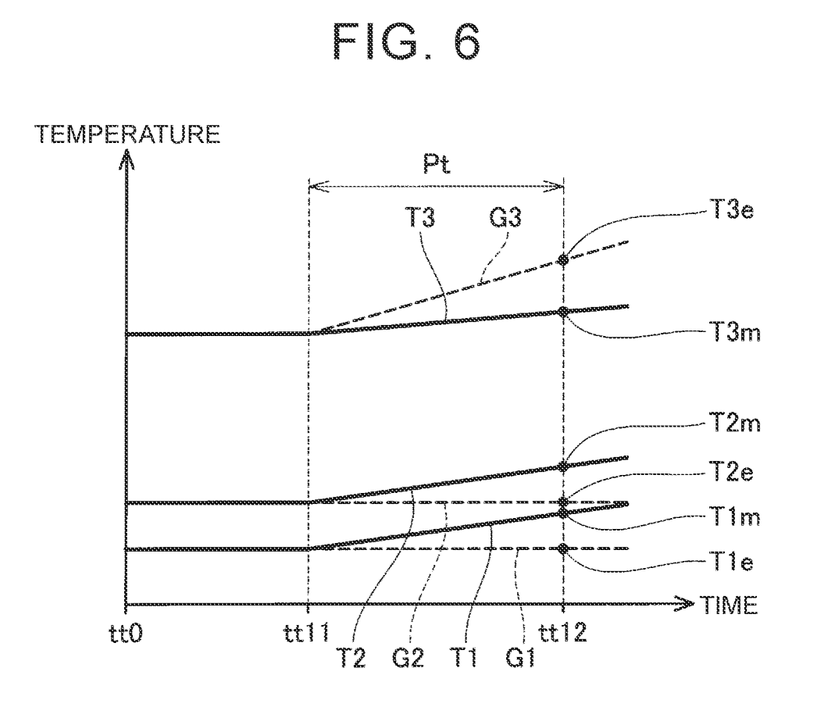
FIG. 6 is a temperature graph of the heating medium in a second mode.

Processing of the slightly open state determination program for determining whether the switching valve 40 is in the slightly open state in the second mode will be described. An example will be described in which a third temperature T3 measured by the third temperature sensor 63 is sufficiently higher than the first temperature T1 and the second temperature T2. In this example, the heating medium does not circulate in the first flow path C1 and the second flow path C2 at the parts that do not constitute the third flow path C3.

At time tt0 in FIG. 6, the switching valve 40 is switched to form the third flow path C3 (see FIG. 2). At time tt11, the first pump 68 operates and the heating medium starts to circulate in the third flow path C3, so that the third temperature T3 starts to rise.

Estimated graphs G1 to G3 are obtained at time tt12 as shown by dashed lines. The estimated graphs G1 to G3 represent estimated values of the slopes of the first temperature T1 to the third temperature T3 when the switching valve 40 is normal. Since the heating medium circulates in the third flow path C3, the estimated graph G3 has an ascending slope. On the other hand, since the heating medium does not circulate in the first flow path C1 and the second flow path C2, the estimated graphs G1, G2 remain constant at their initial temperatures. The first to third temperature measured values T1$m$ to T3$m$ and the first to third temperature estimated values T1$e$ to T3$e$ are acquired. Since these values are acquired by a method similar to that described above, description thereof will be omitted.

When the third temperature measured value T3$m$ is lower than the third temperature estimated value T3$e$ by a value greater than a third predetermined threshold TH3, the first temperature measured value T1$m$ is higher than the first temperature estimated value T1$e$ by a value greater than the first predetermined threshold TH1, and the second temperature measured value T2$m$ is higher than the second temperature estimated value T2$e$ by a value greater than the second predetermined threshold TH2, it can be determined that the switching valve 40 is in the slightly open state. This is because when the switching valve 40 is in the slightly open state, heat is transferred from the high temperature heating medium in the third flow path C3 to the low temperature heating medium in the first flow path C1 and the second flow path C2. This heat transfer causes the following combination of changes in slopes: the rate of increase in third temperature T3 becomes lower than that when the switching valve 40 is normal, and the rate of increase in first temperature T1 and the rate of increase in second temperature T2 become higher than those when the switching valve 40 is normal. By detecting this combination of changes in slopes, it can be determined that the switching valve 40 is in the slightly open state.

Second Embodiment

Figure 7:
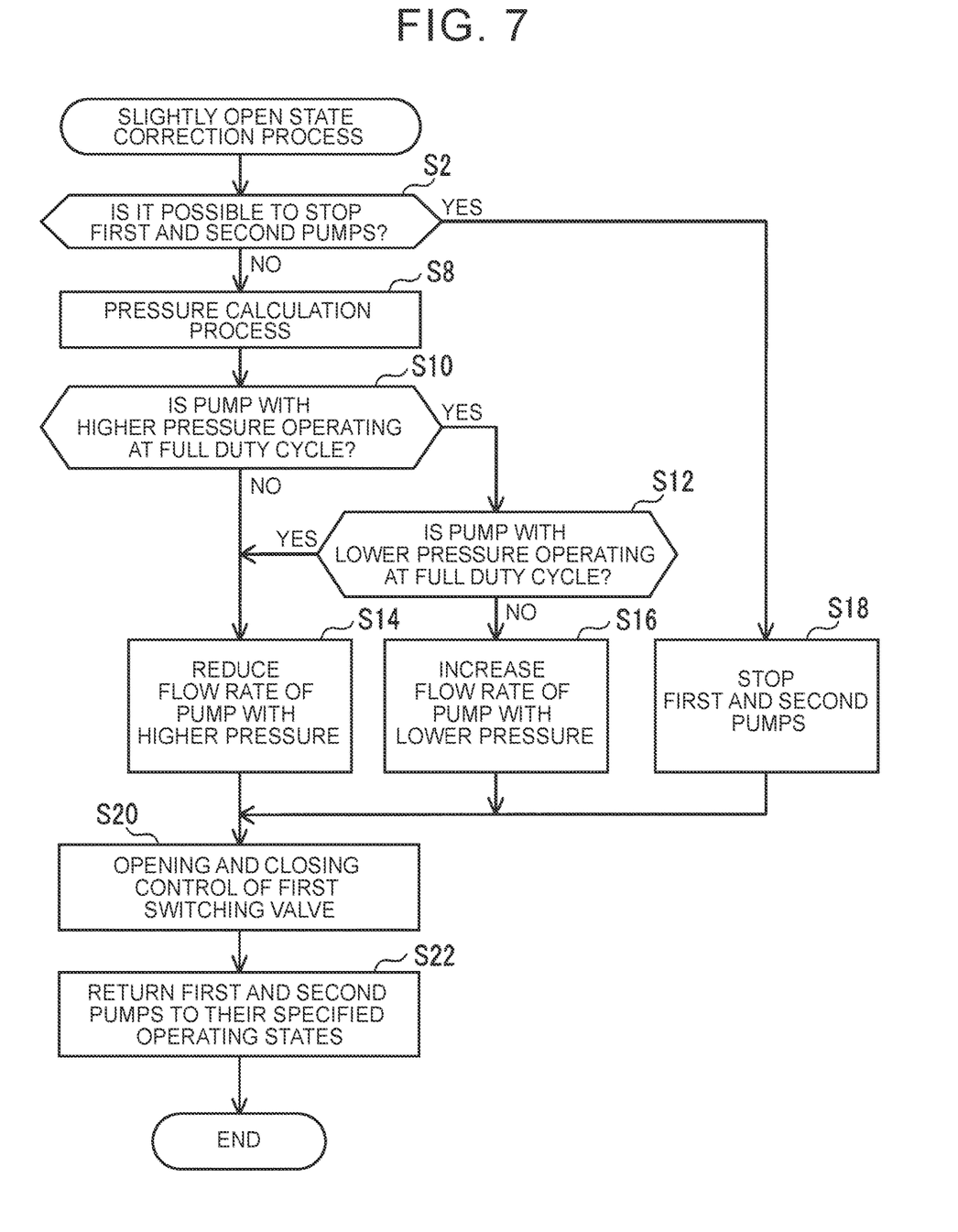
FIG. 7 is a flowchart illustrating a slightly open state correction process.

A slightly open state correction process will be described in a second embodiment. The slightly open state correction process is a process of correcting the slightly open state when it is determined in the first embodiment that the switching valve 40 is in the slightly open state. This process is performed by the slightly open state determination program of the control device 98. As an example, processing when it is determined that the switching valve 40 is in the slightly open state in the first mode will be described below.

The processor of the control device 98 starts the flow shown in FIG. 7 when it is determined that the switching valve 40 is in the slightly open state in the first mode. In step S2, the processor determines whether it is possible to stop the first pump 68 and the second pump 60. For example, when the first temperature measured value T1$m$ and the second temperature measured value T2$m$ have a sufficient margin with respect to a required heating medium temperature value, the processor can determine that it is possible to stop the first pump 68 and the second pump 60. When the processor determines that it is not possible to stop the first pump 68 and the second pump 60, the routine proceeds to step S8.

In step S8, a pressure calculation process is performed. Specifically, a first pressure P1 that is a pressure on the first flow path C1 side of the switching valve 40 and a second pressure P2 that is a pressure on the second flow path C2 side of the switching valve 40 are obtained. The first pressure P1 can be obtained by using the relationship of "first pressure P1=(discharge pressure D1 of first pump 68)−(pressure loss DR1 from first pump 68 to switching valve 40)." The pressure loss DR1 is the sum of component pressure loss due to the component (chiller 70) on the path from the first pump 68 to the switching valve 40 and pipe pressure loss due to the pipe (first circuit 12) from the first pump 68 to the switching valve 40. Similarly, the second pressure P2 can be obtained by using the relationship of "second pressure P2=(discharge pressure D2 of second pump 60)−(pressure loss DR2 from second pump 60 to switching valve 40)." The pressure loss DR2 is the sum of component pressure loss due to the component (oil cooler 54) on the path from the second pump 60 to the switching valve 40 and pipe pressure loss due to the pipe (heat-related device path 18) from the second pump 60 to the switching valve 40. The discharge pressure, the component pressure loss, and the pipe pressure loss are values determined by the duty cycle (flow rate) and the heating medium temperature.

Figure 8:
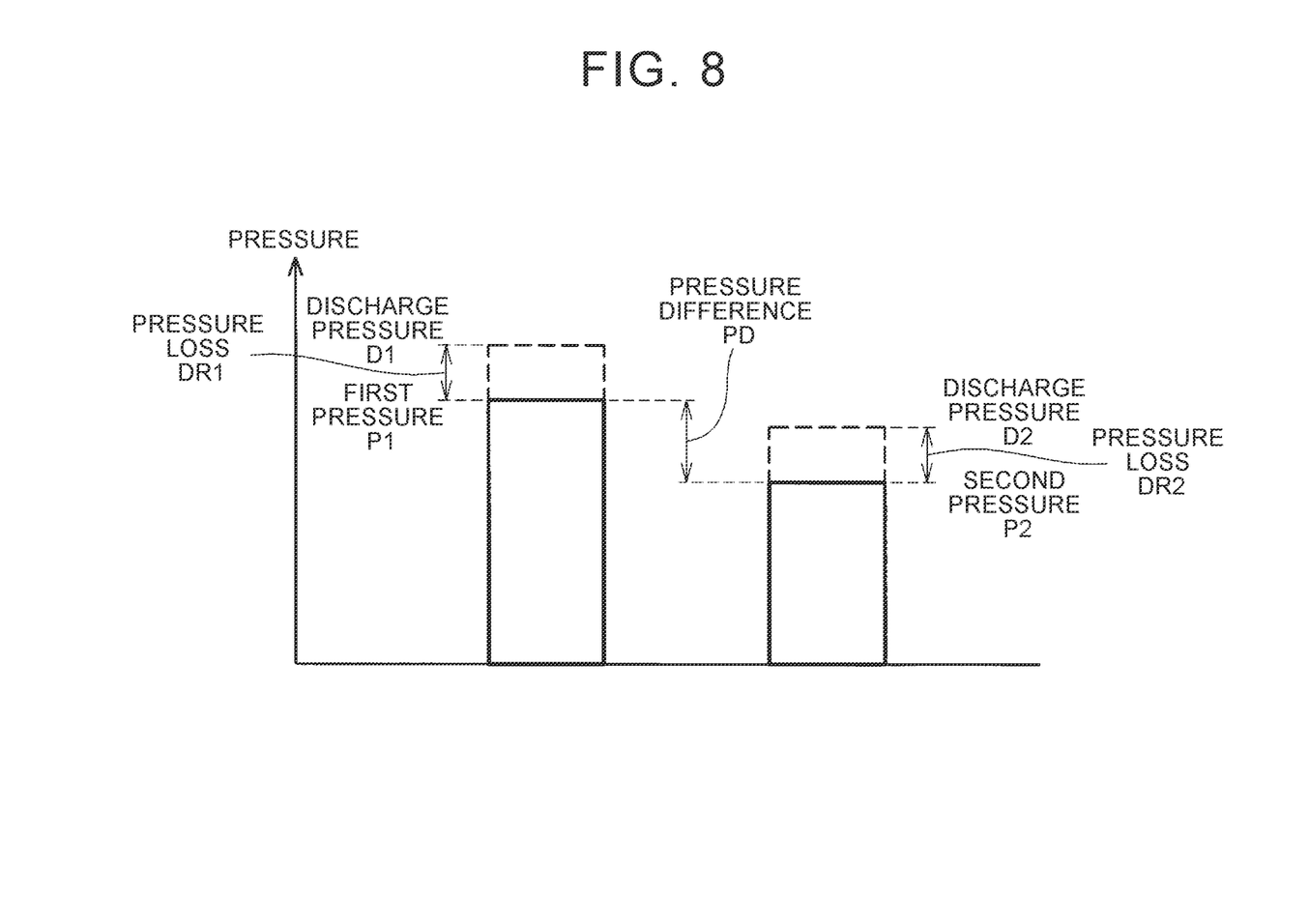
FIG. 8 is a calculation example of a first pressure P1 and a second pressure P2.

FIG. 8 shows a calculation example of the first pressure P1 and the second pressure P2. FIG. 8 shows an example in which the first pressure P1 is higher than the second pressure P2. A pressure difference PD is the difference between the first pressure P1 and the second pressure P2.

A flow rate regulating process is performed in steps S10 to S16. The flow rate regulating process is a process of regulating the flow rate of at least one of the first pump 68 and the second pump 60 so as to reduce the pressure difference PD. The control for reducing the pressure difference PD can be performed in various manners. For example, the control may be performed to reduce the pressure difference PD to a value smaller than a predetermined threshold, to reduce the pressure difference PD by a predetermined rate, or to substantially eliminate the pressure difference PD. This will be described in detail.

In step S10, whether the pump with one of the first pressure P1 and the second pressure P2 that is higher than the other is operating at full duty cycle is determined. When it is determined that the pump with the higher pressure is not operating at full duty cycle (S10: NO), the routine proceeds to step S14, and the flow rate of the pump with the higher pressure is reduced to reduce the pressure difference PD. In the example of FIG. 8, the pressure difference PD is reduced by reducing the flow rate of the first pump 68 and thus lowering the first pressure Pb. On the other hand, when it is determined that the pump with the higher pressure is operating at full duty cycle (S10: YES), the processor determines that there is not enough margin with respect to the required heating medium temperature and that it is difficult to reduce the flow rate of the pump with the higher pressure. The routine then proceeds to step S12.

In step S12, whether the pump with the lower pressure is operating at full duty cycle is determined. When it is determined that the pump with the lower pressure is not operating at full duty cycle (S12: NO), the routine proceeds to step S16, and the processor increases the flow rate of the pump with the lower pressure to reduce the pressure difference PD. In the example of FIG. 8, the pressure difference PD is reduced by increasing the flow rate of the second pump 60 and thus raising the second pressure P2. On the other hand, it is determined that the pump with the lower pressure is operating at full duty cycle (S12: YES), it is difficult to increase the flow rate of the pump with the lower pressure. The routine then proceeds to step S14. In step S14, the processor reduces the flow rate of the pump with the higher pressure to reduce the pressure difference PD. The routine then proceeds to step S20.

When it is determined in step S2 that it is possible to stop the first pump 68 and the second pump 60, the routine proceeds to step S18, and the first pump 68 and the second pump 60 are stopped. As a result, the first pressure P1 and the second pressure P2 are not generated, so that the pressure difference PD can be balanced. The routine then proceeds to step S20.

In step S20, opening and closing control of the switching valve 40 is performed. Specifically, with the pressure difference PD reduced, a process of changing the switching valve 40 to a state corresponding to a mode other than the first mode and then returning the switching valve 40 to a state corresponding to the first mode is performed. The switching valve 40 can thus be restored from the slightly open state to the normal state. The routine then proceeds to step S22, and the first pump 68 and the second pump 60 return to their specified operating states. The slightly open state correction process is thus completed.

Effects of the opening and closing control in step S20 will be described. A switching valve typically has a mechanism for closing a valve element (i.e., for bringing a valve element to a closed position) by a pressing force of a spring etc. The same applies to switching valves having a rotating structure or a structure with a slit. The valve body is subjected to the pressure difference PD between the first pressure P1 and the second pressure P2 when the valve body is closed. This pressure difference PD varies depending on the operating conditions of the first flow path C1 and the second flow path C2. For example, when both the first pump 68 and the second pump 60 are in operation, the pressure of the pump located closer to the switching valve 40 is always applied to the switching valve 40. When only one pump is in operation, only the pressure of the pump in operation is applied to the switching valve 40. When the first pump 68 and the second pump 60 perform fine flow control, the first pressure P1 and the second pressure P2 fluctuates transiently. Since the valve element needs to be completely closed etc. while being subjected to the first pressure P1 and the second pressure P2, the valve element operates transiently and, for example, the valve body may be closed in a tilted state. That is, the valve body may be in the slightly open state rather than being completely closed. The slightly open state can be corrected as it is not a failure. By performing the process of opening and closing the valve element (step S20) after the process of reducing the pressure difference PD (steps S10 to S18), the valve element can be reclosed with less influence from the pressure difference PD. Therefore, the switching valve can be restored from the slightly open state.

Although the slightly open state correction process in the first mode is described above, a slightly open state correction process in the second mode is performed in a similar manner. That is, in step S8, the first pressure P1 on the first flow path C1 side that does not form the third flow path C3, the second pressure P2 on the second flow path C2 side that does not form the third flow path C3, and a third pressure P3 that is a pressure on the third flow path C3 side are calculated. Thereafter, in steps S10 to S16, the flow rate of the first pump 68 is controlled so as to reduce the pressure difference PD between the first to third pressures P1-P3. Since the processing is otherwise the same as the slightly open state correction process in the first mode, description thereof will be omitted.

Modification of Second Embodiment

The switching valve 40 may include a valve element that contacts a valve seat in the first mode. The first pressure P1 may be applied to one side of the valve element, and the second pressure P2 may be applied to the other side of the valve element. In the flow rate regulating process, the processor may regulate the flow rate of at least one of the first pump 68 and the second pump 60 so as to generate a pressure difference PD in a direction that the valve element moves toward the valve seat.

For example, it is herein assumed that the direction of the force the valve element receives from the first pressure P1 is such a direction that the valve element is separated from the valve seat, and the direction of the force the valve element receives from the second pressure P2 is such a direction that the valve element moves toward the valve seat. In this case, when the first pressure P1 is higher than the second pressure P2 as shown in FIG. 8, the pressure difference PD causes such a force that opens the valve element, and therefore the valve element tends to be in the slightly open state. Accordingly, in the flow rate regulating process, the flow rate is controlled so that the second pressure P2 becomes greater than the first pressure P1. As a result, the pressure difference PD causes a force that closes the valve element. Since the pressure difference PD can assist in the operation of pressing the valve element against the valve seat, the switching valve 40 can be reliably restored from the slightly open state.

Although embodiments are described in detail above, these embodiments are merely illustrative and are not intended to limit the scope of the claims. The technology described in the claims includes various modifications and alternations of the specific examples illustrated above. The technical elements illustrated in the present specification or the drawings have technical utility alone or in various combinations, and are not limited to the combinations described in the claims at the time of filing. The technology illustrated in the present specification or the drawings may achieve a plurality of objects at the same time, and has technical utility by achieving one of the objects.

MODIFICATIONS

Figure 9:
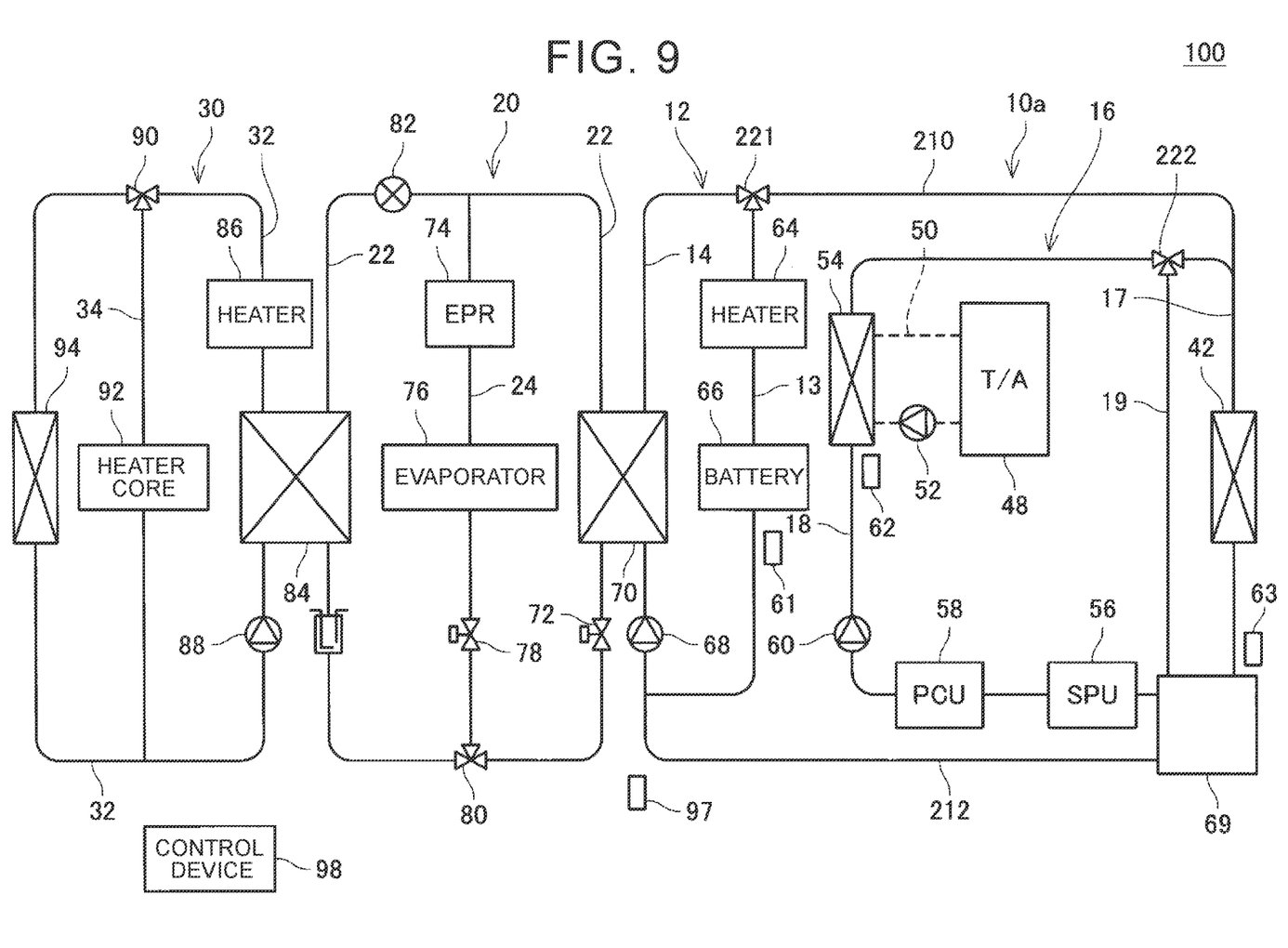
FIG. 9 shows a low temperature radiator circuit 10a of a modified embodiment.

In the above embodiments, switching between the first and second modes is performed by the switching valve 40 that is a five-way flow control valve. However, the technology disclosed in the present specification is not limited to this. The number of switching valves and their positions can be determined as desired. For example, as in a low temperature radiator circuit 10a shown in FIG. 9, switching between the first and second modes may be performed by two switching valves, namely a first switching valve 221 and a second switching valve 222. The first switching valve 221 and the second switching valve 222 are three-way flow control valves. The first switching valve 221 is located at the connection between the first circuit 12 and a connection circuit 210. The second switching valve 222 is located at a branch point of the bypass path 19 of the second circuit 16. The slightly open state determination process (first embodiment) and the slightly open state correction process (second embodiment) are also applicable to the arrangement of the switching valves shown in FIG. 9.

The structure in which the first circuit 12 and the second circuit 16 are connected via the reservoir tank 69 is described in the above embodiments. However, the technology disclosed in the present specification is not limited to this structure, and various connection structures can be used. For example, the first circuit 12 and the second circuit 16 may be connected using a three-way pipe instead of the reservoir tank 69.

The method for acquiring the first to third temperature estimated values T1e to T3e is not limited to the method using the estimated graphs G1 to G3, and various methods can be used. For example, a map of temperature estimated values may be used instead of the graphs.

The flow rate of either the first pump 68 or the second pump 60 is regulated in the flow rate regulating process shown in FIG. 7. However, the technique disclosed in the present specification is not limited to this form. The flow rates of both the first pump 68 and the second pump 60 may be regulated.

The positions of the first to third temperature sensors 61 to 63 in the above embodiments are merely illustrative, and the technology disclosed in the present specification is not limited to this.

In the above description, the thermal management system 100 is mounted on an electrified vehicle. However, the technology disclosed in the present specification is not limited to this. The thermal management system 100 may be used as a stationary thermal management system. In the above description, the thermal management system 100 includes a battery cooling circuit (battery cooling system) for cooling the battery 66. However, the thermal management system 100 may be used as a cooling system for other batteries such as a fuel cell.

In the above description, the thermal management system 100 includes the heat pump circuit 20 and the high temperature radiator circuit 30. However, the thermal management system 100 need not necessarily include the heat pump circuit 20 and the high temperature radiator circuit 30. The thermal management system 100 can be any system that includes the intention of battery cooling.

The control device 98 is an example of the control unit. Time tt2 is an example of the first predetermined time. Time tt12 is an example of the second predetermined time.

What is claimed is:

1. A thermal management system for a vehicle, the thermal management system comprising:
a first flow path through which a heating medium flows;
a first pump that is located on the first flow path and that circulates the heating medium in the first flow path;
a first temperature sensor that is located on the first flow path and that is configured to measure a first temperature of the heating medium;
a second flow path through which the heating medium flows;

a second pump that is located on the second flow path and that circulates the heating medium in the second flow path;

a second temperature sensor that is located on the second flow path and that is configured to measure a second temperature of the heating medium;

a switching valve configured to switch between a first mode in which the first flow path and the second flow path are separated and a second mode in which a part of the first flow path and a part of the second flow path are connected to constitute a third flow path; and a control unit that determines whether the switching valve is in a slightly open state, wherein:

a temperature of the heating medium in the second flow path is higher than a temperature of the heating medium in the first flow path; and in the first mode, the control unit
  acquires a measured value of the first temperature from the first temperature sensor and a measured value of the second temperature from the second temperature sensor at first predetermined time that is when a predetermined amount of time has passed since at least one of the first temperature and the second temperature started to rise,
  acquires an estimated value of the first temperature and an estimated value of the second temperature at the first predetermined time that are estimated values when the switching valve is not in the slightly open state, and
  determines that the switching valve is in the slightly open state when the measured value of the first temperature is higher than the estimated value of the first temperature by a value greater than a first predetermined threshold and the measured value of the second temperature is lower than the estimated value of the second temperature by a value greater than a second predetermined threshold.

2. The thermal management system according to claim 1, further comprising a third temperature sensor that is located on the third flow path and that is configured to measure a third temperature of the heating medium, wherein:

the first temperature sensor is located on the first flow path at a part that does not constitute the third flow path;

the second temperature sensor is located on the second flow path at a part that does not constitute the third flow path;

a temperature of the heating medium in the third flow path is higher than the temperature of the heating medium in the first flow path and the temperature of the heating medium in the second flow path; and in the second mode, the control unit
  acquires the measured value of the first temperature from the first temperature sensor, the measured value of the second temperature from the second temperature sensor, and a measured value of the third temperature from the third temperature sensor at second predetermined time that is when a predetermined amount of time has passed since the third temperature started to rise,
  acquires the estimated value of the first temperature, the estimated value of the second temperature, and an estimated value of the third temperature at the second predetermined time that are estimated values when the switching valve is not in the slightly open state, and
  determines that the switching valve is in the slightly open state when the measured value of the first temperature is higher than the estimated value of the first temperature by a value greater than the first predetermined threshold, the measured value of the second temperature is higher than the estimated value of the second temperature by a value greater than the second predetermined threshold, and the measured value of the third temperature is lower than the estimated value of the third temperature by a value greater than a third predetermined threshold.

3. The thermal management system according to claim 2, further comprising a heat generation map showing amounts of heat to be generated by heat generation sources in the first to third flow paths in various operating states, wherein
  the estimated value of the first temperature, the estimated value of the second temperature, and the estimated value of the third temperature are obtained based on the heat generation map.

4. The thermal management system according to claim 1, wherein when the control unit determines that the switching valve is in the slightly open state in the first mode, the control unit
  performs a flow rate regulating process of regulating a flow rate of at least one of the first pump and the second pump so as to reduce a pressure difference between a first pressure and a second pressure, the first pressure being a pressure on a side of the switching valve at the first flow path, and the second pressure being a pressure on a side of the switching valve at the second flow path,
  while performing the flow rate regulating process, performs a process of changing the switching valve to a state corresponding to a mode other than the first mode and then returning the switching valve to a state corresponding to the first mode, and
  performs a process of ending the flow rate regulating process.

5. The thermal management system according to claim 4, wherein in the flow rate regulating process,
  at least one of a process of reducing the flow rate of the first pump and a process of increasing the flow rate of the second pump is performed when the first pressure is higher than the second pressure, and
  at least one of a process of reducing the flow rate of the second pump and a process of increasing the flow rate of the first pump is performed when the second pressure is higher than the first pressure.

6. The thermal management system according to claim 4, wherein in the flow rate regulating process, the first pump and the second pump are stopped so as to substantially balance the first pressure and the second pressure.

7. The thermal management system according to claim 4, wherein:
  the switching valve includes a valve element that contacts a valve seat in the first mode;
  the first pressure is applied to one side of the valve element, and the second pressure is applied to another side of the valve element; and
  in the flow rate regulating process, the flow rate of at least one of the first pump and the second pump is regulated so as to cause a pressure difference in such a direction that the valve element moves toward the valve seat.

8. The thermal management system according to claim 1, wherein in the first mode,
  the control unit acquires the measured value of the first temperature from the first temperature sensor and the measured value of the second temperature from the second temperature sensor at third predetermined time that is when a predetermined amount of time has passed since at least one of the first temperature and the second temperature started to rise, and when the first temperature and the second temperature are equal to each other, the control unit determines that the switching valve is broken.

\* \* \* \* \*